United States Patent
Jain et al.

(10) Patent No.: US 7,610,304 B2
(45) Date of Patent: Oct. 27, 2009

(54) TECHNIQUES FOR PERFORMING FILE OPERATIONS INVOLVING A LINK AT A DATABASE MANAGEMENT SYSTEM

(75) Inventors: Namit Jain, Santa Clara, CA (US); Nipun Agarwal, Santa Clara, CA (US); Ravi Murthy, Fremont, CA (US); Syam Pannala, San Jose, CA (US); Vikram Kapoor, Sunnyvale, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 261 days.

(21) Appl. No.: 11/294,894

(22) Filed: Dec. 5, 2005

(65) Prior Publication Data

US 2007/0130157 A1 Jun. 7, 2007

(51) Int. Cl.
*G06F 17/30* (2006.01)
*G06F 15/16* (2006.01)
(52) U.S. Cl. .......................................... 707/102; 707/1
(58) Field of Classification Search .................... 707/10
See application file for complete search history.

(56) References Cited

U.S. PATENT DOCUMENTS

| | | |
|---|---|---|
| 5,388,257 A | 2/1995 | Bauer |
| 5,768,532 A | 6/1998 | Megerian |
| 5,918,229 A | 6/1999 | Davis et al. |
| 5,937,406 A | 8/1999 | Balabine et al. |
| 5,956,712 A | 9/1999 | Bennett et al. |
| 5,987,506 A | 11/1999 | Carter et al. |
| 6,029,160 A | 2/2000 | Cabrera et al. |
| 6,032,216 A | 2/2000 | Schmuck et al. |
| 6,044,378 A | 3/2000 | Gladney |
| 6,088,694 A | 7/2000 | Burns et al. |
| 6,304,873 B1 | 10/2001 | Klein et al. |
| 6,321,219 B1* | 11/2001 | Gainer et al. ............... 707/3 |

(Continued)

FOREIGN PATENT DOCUMENTS

EP          0 398 495 A2     11/1990

OTHER PUBLICATIONS

David Madore, GCFS: A Garbage-Collected Filesystem for Linux, Feb. 4, 2000, pp. 1-15.*

(Continued)

*Primary Examiner*—Cam Y T Truong
(74) *Attorney, Agent, or Firm*—Hickman Palermo Truong & Becker LLP; Christian A. Nicholes

(57) ABSTRACT

A method and apparatus for performing file system operations involving a link is provided. A request to perform a file system operation involving a link is received from a client at a database server. The link may establish a relationship a source resource has to a target resource. The source resource and the target resource may be stored within a repository implemented by a storage medium, such as a database. The database server may perform the file system operation by storing, in the database, one or more link records that identifies the link between the first resource and the second resource. File system operations, such as a NFS file system operation, which involve links may be performed at a database management system.

24 Claims, 3 Drawing Sheets

U.S. PATENT DOCUMENTS

| | | | |
|---|---|---|---|
| 6,389,420 | B1 | 5/2002 | Vahalia et al. |
| 6,393,435 | B1 | 5/2002 | Gartner et al. |
| 6,393,456 | B1 | 5/2002 | Ambler et al. |
| 6,442,548 | B1 | 8/2002 | Balabine et al. |
| 6,453,313 | B1 | 9/2002 | Klein et al. |
| 6,457,007 | B1 | 9/2002 | Kikuchi et al. |
| 6,487,469 | B1 | 11/2002 | Formenti |
| 6,493,742 | B1 | 12/2002 | Holland et al. |
| 6,496,944 | B1 | 12/2002 | Hsiao et al. |
| 6,532,488 | B1 | 3/2003 | Ciarlante et al. |
| 6,549,916 | B1 | 4/2003 | Sedlar |
| 6,564,215 | B1 | 5/2003 | Hsiao et al. |
| 6,587,873 | B1 | 7/2003 | Nobakht et al. |
| 6,728,709 | B1 | 4/2004 | Plasek et al. |
| 6,732,124 | B1 | 5/2004 | Koseki et al. |
| 6,772,155 | B1 | 8/2004 | Stegelmann |
| 6,779,001 | B1 | 8/2004 | Kanai et al. |
| 6,799,188 | B2 | 9/2004 | Weedon |
| 6,850,938 | B1 | 2/2005 | Sadjadi |
| 6,857,001 | B2 | 2/2005 | Hitz et al. |
| 6,877,095 | B1 | 4/2005 | Allen |
| 6,948,039 | B2 | 9/2005 | Blessener et al. |
| 6,959,313 | B2 | 10/2005 | Kapoor et al. |
| 6,959,416 | B2 | 10/2005 | Manning et al. |
| 7,043,472 | B2 | 5/2006 | Aridor et al. |
| 7,072,896 | B2 | 7/2006 | Lee et al. |
| 7,076,509 | B1 | 7/2006 | Chen et al. |
| 7,085,785 | B2 | 8/2006 | Sawdon et al. |
| 7,117,216 | B2 | 10/2006 | Chakraborty |
| 7,139,781 | B2 | 11/2006 | Young et al. |
| 7,143,120 | B2 | 11/2006 | Oks et al. |
| 7,162,466 | B2 | 1/2007 | Kaasten et al. |
| 7,177,866 | B2 | 2/2007 | Holenstein et al. |
| 7,280,995 | B1 * | 10/2007 | Sedlar .......................... 707/1 |
| 7,366,740 | B2 | 4/2008 | Sleeman et al. |
| 7,437,407 | B2 | 10/2008 | Vahalia et al. |
| 2001/0051958 | A1 | 12/2001 | DeVries et al. |
| 2002/0073056 | A1 | 6/2002 | Broster et al. |
| 2002/0128995 | A1 | 9/2002 | Muntz et al. |
| 2002/0184216 | A1 | 12/2002 | Chandrasekaran et al. |
| 2003/0033285 | A1 * | 2/2003 | Jalali et al. ..................... 707/1 |
| 2003/0069902 | A1 | 4/2003 | Narang et al. |
| 2003/0144980 | A1 | 7/2003 | Holmgren |
| 2003/0172149 | A1 | 9/2003 | Edsall et al. |
| 2003/0195865 | A1 | 10/2003 | Long et al. |
| 2004/0044643 | A1 | 3/2004 | DeVries et al. |
| 2004/0107225 | A1 | 6/2004 | Rudoff |
| 2004/0111422 | A1 | 6/2004 | Devarakonda et al. |
| 2004/0133607 | A1 | 7/2004 | Miloushev et al. |
| 2004/0133652 | A1 | 7/2004 | Miloushev et al. |
| 2004/0167932 | A1 | 8/2004 | Edmonds |
| 2004/0199540 | A1 | 10/2004 | Nojima |
| 2004/0215772 | A1 | 10/2004 | Dinker et al. |
| 2004/0225922 | A1 | 11/2004 | Susarla et al. |
| 2004/0230560 | A1 | 11/2004 | Elza et al. |
| 2004/0255048 | A1 | 12/2004 | Lev Ran et al. |
| 2005/0039049 | A1 | 2/2005 | Chang et al. |
| 2005/0050054 | A1 | 3/2005 | Clark et al. |
| 2005/0063324 | A1 | 3/2005 | O'Neill et al. |
| 2005/0091287 | A1 | 4/2005 | Sedlar |
| 2005/0120140 | A1 | 6/2005 | Williams et al. |
| 2005/0149525 | A1 | 7/2005 | Verma et al. |
| 2005/0203903 | A1 | 9/2005 | Rajan et al. |
| 2005/0210034 | A1 | 9/2005 | Howard |
| 2005/0223014 | A1 | 10/2005 | Sharma et al. |
| 2005/0234867 | A1 | 10/2005 | Shinkai |
| 2005/0278394 | A1 | 12/2005 | Oks et al. |
| 2005/0283504 | A1 | 12/2005 | Suzuki et al. |
| 2005/0289143 | A1 | 12/2005 | Oshri et al. |
| 2006/0129556 | A1 | 6/2006 | Reuter |
| 2006/0136376 | A1 | 6/2006 | Jain et al. |
| 2006/0136508 | A1 | 6/2006 | Idicula et al. |
| 2006/0136509 | A1 | 6/2006 | Pannala et al. |
| 2006/0136516 | A1 | 6/2006 | Jain et al. |
| 2006/0143177 | A1 | 6/2006 | Idicula et al. |
| 2006/0173851 | A1 | 8/2006 | Singh et al. |
| 2008/0215528 | A1 | 9/2008 | Sedlar |

OTHER PUBLICATIONS

Mellande,Unix Filesystem Security, Jun. 5, 2002, pp. 1-26.*
RFC1813 - NFS Version 3 Protocol Specification, Callaghan, Pawlowski, Staubach, Jun. 1995 (or hereinafter "NFS") (pp. 1- 93).*
International Preliminary Examining Authority, "Notification of Transmittal of the International Preliminary Report on Patentability," PCT/US2005/015033, received Feb. 21, 2007, 7 pages.
Claims as filed on Oct. 13, 2006 for PCT/US2005/015033 (50277-2766), 5 pages (attached).
International Searching Authority, "Notification of Transmittal of the International Search Report and the Written Opinion of the International Searching Authority, or the Deceleration," PCT/US2006/039706 (50277-3176), dated Feb. 22, 2007, 13 pages.
Current Claims PCT/US2006/039706, 4 pages.
Arnold-Moore, Tim et al., "Architecture of a Content Management Server for XML Document Application," Web information Systems Engineering 2000, IEEE Computer Society—vol. 1, Jun. 19, 2000, XP010521842, pp. 97-108.
Sato, Hiroyuki et al., "Hyperclip: A Tool for Gathering and Sharing Meta-Data on User's Activities by Using Peer-to-Peer Technology," NTT Corporation—May 2002, retrieved from the internet at http://www.cs.rutgers.edu/{shklar/www11/final-submissions/paper12.pdf, retrieved on Jan. 29, 2007, 5 pages.
Wilde, Erik et al., "From Content-centered Publishing to a Link-based View of Information Resources," Proceedings of the 33$^{rd}$ Annual Hawaii International Conference—Jan. 4-7, 2000, XP010545318, pp. 1-10.
Wollschlaeger, Martin et al., "XML based Description Model as a Platform for Web-based Maintenance," Industrial Informatics Conference 2004, XP010782616, pp. 125-130.
European Patent Office, "Communication Pursuant to Article 96(2) EPC," App. No., 00952215.2, dated Oct. 5, 2006, received on Oct. 13, 2006, 7 pages.
Amended Claims, EP App. 00952215.2, 26 pages.
Satyanarayanan, Mahadev, "Scalable, Secure, and Highly Available Distributed File Access", Carnegie Mellon University, Computer, vol. 23, No. 5, 12 pages.
Thekkath, Chandramohan A. et al., "Frangipani: A Scalable Distributed File System," ACM Press, Systems Research Center, SIGOPS Operation System, Rev. 31, Dec. 1997, 14 pages.
Gupta, Sandeep K.S. et al., "A Strategy to Manage Cache Consistency in a Disconnected Distributed Environment", Parallel and Distributed Systems, IEEE Transactions, vol. 12, No. 7, Jul. 2001, 15 pages.
Murphy, Nick, et al., "The Design and Implementation of the Database File System", Harvard University, 2002, 12 pages.
Bhattacharya, Supama, et al., "Coordinating Backup/Recovery and Data Consistency between Database and File Systems", ACM, Jun. 2002, 11 pages.
N. Gehani et al., "OdeFs: A File System Interface to an Object-Oriented Database", AT&T Bell Laboratories, New Jersey, 1989, 18 pages.
Pawlowski, Brian et al., "The NFS Version 4 Protocol", in Proceedings of the 2nd International System Administration and Networking Conference, 2000, pp. 1-20.
"Communication pursuant to Article 94(3) EPC" received in Application No. 05 741 078.9—1225 dated Jul. 7, 2009 (5 pages).
Current Claims in Application No. 05 741 078.9 —1225 dated Jun. 21, 2007 (3 pages).

* cited by examiner

TECHNIQUES FOR PERFORMING FILE OPERATIONS INVOLVING A LINK AT A DATABASE MANAGEMENT SYSTEM

RELATED APPLICATION DATA

This application is related to U.S. patent application Ser. No. 11/014,354, entitled "Infrastructure For Performing File Operations By A Database Server," filed on Dec. 16, 2004, referred to below as the "file system operations patent," which is incorporated by reference in its entirety as if fully set forth herein.

This application is also related to U.S. patent application Ser. No. 11/013,889, entitled "Techniques For Transaction Semantics For A Database Server Performing File Operations," filed on Dec. 16, 2004, which is incorporated by reference in its entirety as if fully set forth herein.

This application is also related to U.S. patent application Ser. No. 11/013,890, entitled "Techniques For Maintaining Consistency For Different Requestors Of Files In A Database Management System," filed on Dec. 16, 2004, which is incorporated by reference in its entirety as if fully set forth herein.

This application is also related to U.S. patent application Ser. No. 11/013,519, entitled "Techniques For Providing Locks For File Operations In A Database Management System," filed on Dec. 16, 2004, which is incorporated by reference in its entirety as if fully set forth herein.

This application is also related to U.S. patent application Ser. No. 11/172,674, entitled "Supporting Replication Among a Plurality of File Operation Servers," filed Jun. 30, 2005, which is incorporated by reference in its entirety as if fully set forth herein.

This application is also related to U.S. patent application Ser. No. 11/172,472, entitled "Sharing State Information Among a Plurality of File Operation Servers," filed Jun. 29, 2005, which is incorporated by reference in its entirety as if fully set forth herein.

This application is also related to U.S. patent application Ser. No. 11/172,088, entitled "Method and Mechanism for Supporting Virtual Content in Performing File Operations at a RDBMS," filed Jun. 29, 2005, referred to below as "the virtual folder patent," which is incorporated by reference in its entirety as if fully set forth herein.

This application is also related to U.S. patent application Ser. No. 11/014,442, entitled "A Comprehensive Framework to Integrate Business Logic into a Repository," filed on Dec. 15, 2004, referred to herein as the "the framework patent application," which is incorporated by reference as if fully set forth herein.

This application is also related to U.S. patent application Ser. No. 11/256,527, entitled "Managing relationships between resources stored within a repository," filed Oct. 20, 2005, which is incorporated by reference in its entirety as if fully set forth herein.

Field of the Invention

The present invention relates to performing file operations involving a link at a database management system.

BACKGROUND

Data may be stored in many types of storage mechanisms, such as databases and file servers. Each storage mechanism typically has its own means of access. For example, the SQL protocol is typically used to perform operations on a database, and the NFS protocol is typically used to perform operations on a file system. The SQL protocol is an ANSI standard for accessing and manipulating data stored in a database. The NFS protocol is a distributed file system protocol that supports the performance of file operations on files across a network. NFS is a well-known standard for sharing files between UNIX hosts.

In the NFS protocol, file system operations are performed on files using a filehandle, which is an identifier that identifies a particular resource. The current version of NFS, version 4 (which is specified in RFC 3530 and RFC 3010) supports additional functionality over version 3, such as enhancements to security and to the performance of stateful operations.

It is desirable to access as many kinds of data as possible from a single storage mechanism. For example, minimizing of the number of different types of storage mechanisms that are used to store and access data tends to reduce the amount of resources required to maintain the storage mechanisms. Also, accessing as many kinds of data as possible from a central location, such as a database, promotes ease of use and security, as data need not be accessed from a plurality of mechanisms that each enforce different security policies. Consequently, performing file operations upon as many files as possible through a centralized access mechanism is desirable.

Approaches for accessing resources using a file system operation protocol in a database management system are disclosed in U.S. patent application Ser. No. 11/014,354. According to these approaches, files may be stored in a file system repository maintained by a database server. Clients may perform file system operations on files, stored in the file system repository implemented by a database, by communicating with a database server using a file system operation protocol, such as the NFS protocol.

Various file system protocols, such as the NFS protocol, support file system operations involving a link. For example, using version 4.0 of the NFS protocol, a user may create a link from a first resource to a second resource by executing a CREATE or LINK command. As a result, it is desirable to perform file system operations that involve a link upon resources stored in a file system repository implemented by a database.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Functional Overview

Embodiments of the invention provide for the performance of file system operations involving a link by a database management system. For example, embodiments of the invention may be used to perform a NFS file system operation involving a link by a database management system. A link is a named connection between a first resource (such as a directory) and a second resource (such as a file). A user or a program can instruct a server where to find a resource by specifying the name of a link to the resource. A link can be used as a path name or as part of a path name. For ease of explanation, when a first resource has a link to a second resource, the first resource shall be denoted as a "source resource," and the second resource shall be denoted as a "target resource."

Illustrative file system operations that may involve a link include creating a link from a source resource to a target resource, deleting a link, and accessing a target resource identified by a link. For example, in the NFS protocol, a link may be created using the CREATE or LINK command. In the detailed description, the names of commands of a particular file system protocol, such as NFS, shall be recited in all capital letters.

In an embodiment, a request to perform a NFS operation to create a link from a source resource to a target resource is received at a database server. The source resource and the target resource are stored within a repository. The repository is implemented by a database. The server may carry out the NFS operation by accessing, in the database, one or more link records associated with the link between said first resource and said second resource.

Advantageously, embodiments of the invention allow file system operations, such as NFS file system operations, which involve links to be performed at a database management system. Having described a functional overview of an embodiment, an architecture overview of an embodiment will be discussed below.

Architecture Overview

Figure 1:
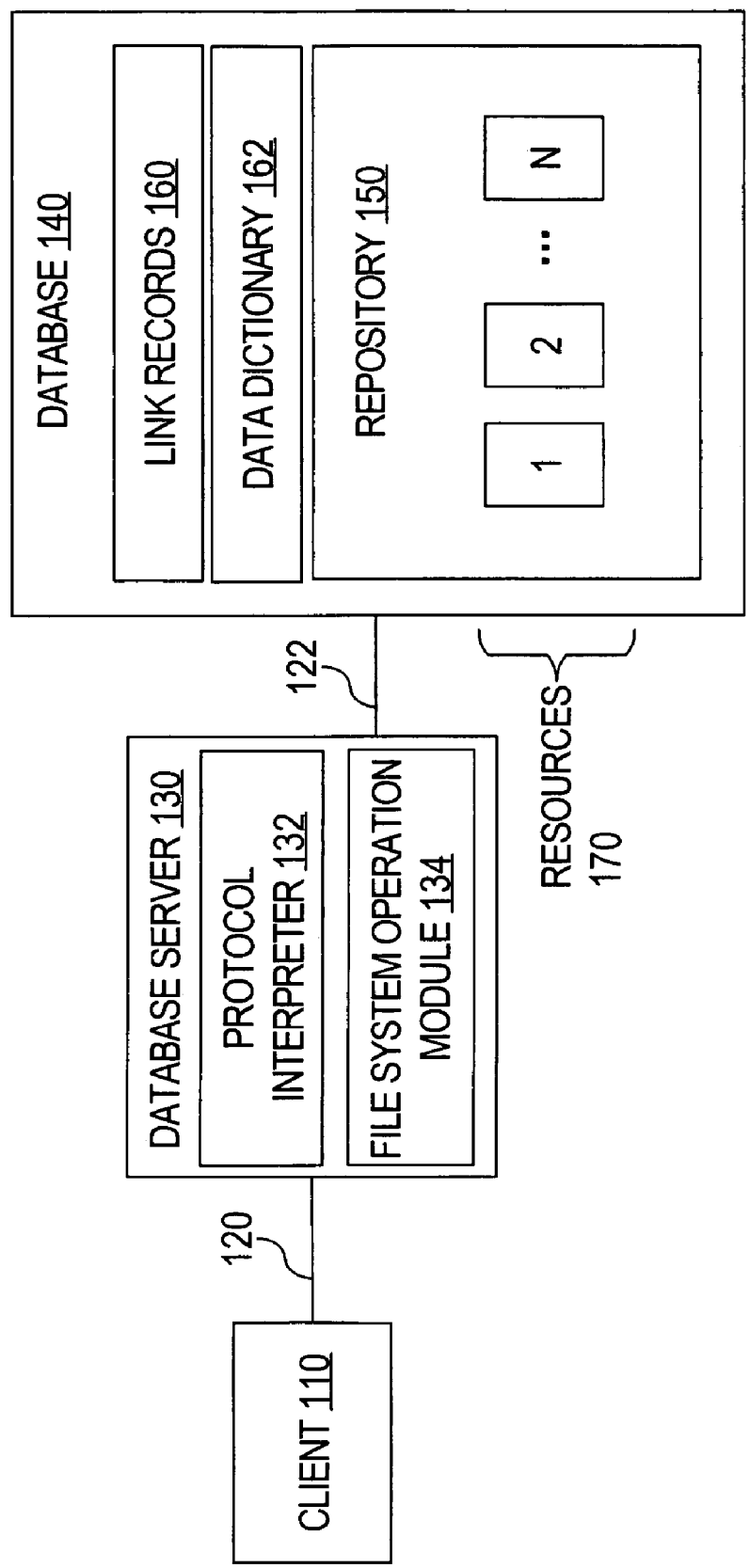
FIG. 1 is a graphical depiction of a system according to an embodiment of the invention.

FIG. 1 is a graphical depiction of system 100 according to an embodiment of the invention. System 100 of FIG. 1 may be used to perform a file system operation involving a link within a storage medium, such as a database management system. According to the embodiment depicted in FIG. 1, system 100 comprises client 110, communications links 120 and 122, database server 130, and database 140. In the embodiment of FIG. 1, database 140 comprises repository 150, one or more link records 160, data dictionary 162, and one or more resources 170. System 100 of FIG. 1 is merely illustrative; other embodiments of the invention may employ different components than those depicted in FIG. 1.

Client 110 may be implemented by any medium or mechanism that provides for issuing a request to perform a file system operation involving a link within repository 150. For example, a user may use client 110 for performing a NFS file system operation involving a link, such as the creation or deletion of a link within repository 150. Non-limiting, illustrative examples of client 110 include a web browser, a wireless device, a cell phone, a personal computer, and a software application. For ease of explanation, only a single client is depicted in FIG. 1, although other embodiments of the invention may comprise two or more clients.

Communications link 120 may be implemented by any medium or mechanism that provides for the exchange of data between client 110 and database server 130. Communications link 122 may be implemented by any medium or mechanism that provides for the exchange of data between database server 130 and database 140. Examples of communications links 120 and 122 include, without limitation, a network such as a Local Area Network (LAN), Wide Area Network (WAN), Ethernet or the Internet, or one or more terrestrial, satellite or wireless links.

Database server 130 may be implemented by any medium or mechanism that provides for receiving and processing requests from client 110. For example, database server 130 may process a request, received from client 110, to perform a file system operation to create a link in repository 150. Non-limiting, illustrative examples of database server 130 include a database server or any server capable of issuing commands to database 140.

In an embodiment, database server 130 is a combination of a set of integrated software components and an allocation of computational resources, such as memory and processes for executing the set of integrated software components on a processor, where the combination of software and computational resources are used for managing database 140. Among other functions of database management, database server 130 governs and facilitates access to database 140 and processes requests by database clients (such as client 110) to access database 130. Database 140 includes unstructured and structured data. Structured data is data structured according to a metadata description defining the structure. Structured data includes relational tables, object tables, object-relational tables, and bodies of data structured according to the Extensible Markup Language ("XML"), such as XML documents. Database 140 may include files that hold unstructured or unstructured data.

Typically, clients of database server 130 may access data managed by database server 130 by issuing database commands to the database service. Typically, the database commands conform to a database language, such as a standard or proprietary form of SQL. When database server 130 receives a database command, database server 130 executes the command. The database commands may request data from the database or request modification to data stored in the database.

One special form of a database server is a repository server. A repository server may be used to access a repository, such as repository 150. Thus, client 110 may access repository 150 by transmitting a request for a file system operation, to be performed against repository 150, to database server 130. Repository 150 is described in further detail below.

In an embodiment, database server 130 includes a protocol interpreter 132 and a file system operation module 134. Protocol interpreter 132 is a software component that receives requests from clients, dispatches the received request to a component of database server 130 for processing, and thereafter sends the results of processing the request back to client 110 in a response. For example, in response to protocol interpreter 132 receiving a request to perform a file system operation, protocol interpreter 132 transfers the request to file system operation module 134 for processing.

For ease of explanation, the examples discussed herein involve protocol interpreter 132 receiving a request for the performance of a file system operation (such as a NFS file system operation) from client 110, although, as explained in the file system operations patent, protocol interpreter 332 may receive and process requests conforming to a variety of protocols, such as HTTP/DAV, FTP, SQL, etc.

In an embodiment, protocol interpreter 132 maintains state information that describes the state of processing file system operations at database server 130 in volatile memory. Various mechanisms may be used by protocol interpreter 132 to maintain the state information in volatile memory, such as a set of b-trees or a set of hash tables. Additional description of protocol interpreter 132 is provided in the file system operations patent identified above.

File system operation module 134 is a software component that processes requests to perform file system operations that are received at database server 130. For example, file operation module 134 may process a request, received from client 110, for the performance of a file system operation involving a link. The processing of a file system operation by file system operation module 134 will be described in further detail below.

Database 140 may be implemented by any medium or mechanism that provides for storing link records in volatile or non- volatile memory. Non-limiting, illustrative examples of database 140 include a database, volatile memory, and any machine-readable medium. In the embodiment depicted in FIG. 1, database 140 implements repository 150. In other embodiments (not shown in FIG. 1), repository 150 is not implemented by database 140, and repository 150 is separate and distinct from database 140. For example, repository 150 may be accessed using a virtual folder, as explained in further detail in the virtual folder patent.

Database 140 may be used to store one or more link records 160. A link record is a record that describes a link between two or more resources stored in repository 150. For example, in an embodiment, a link record may be embodied as one or more rows of one or more tables of database 140. A particular link record may describe a type of link between two or more resources, information that identifies the resources involved in the link, and any other information about how the relationship, such as how to identify, to client 110, the resources involved in the link.

Data dictionary 162, as broadly used herein, refers to any information maintained by database 140 for uniquely identifying, to database 140, the resources that are stored in database 140. For example, data dictionary 162 may contain a list of database resource identifiers. Each database resource identifier (sometimes referred to as an object identifier, or OID) uniquely identifies a particular resource stored in database 140. A data dictionary 162 may also contain other bookkeeping information used by the database 140 to manage the resources stored therein. For example, data dictionary 162 may also store, for each resource within repository 150, a path to the resource. Thus, file operation module 134 can access data dictionary 162 to identify an object identifier for a target resource identified by a particular path. Similarly, file operation module 134 can access data dictionary 162 to identify a path to a target resource for a particular object identifier that identifies the target resource.

Repository 150 may be implemented by any medium or mechanism that provides for implementing a file system. Repository 150 may provide a hierarchy of folders in which resources may be stored. Repository 150 may be implemented as a file system repository, which is a mechanism for storing and organizing files and the data they contain to make it easy to find and access them. File systems repositories may use a storage device such as a hard disk or CD-ROM and involve maintaining the physical location of the files, or they may be virtual and exist only as an access method for virtual data or for data over a network (e.g. NFS). Non-limiting, illustrative examples of repository 150 include a NFS file system repository.

Repository 150 may be used to store one or more resources 170. A resource, as used herein, refers to any unit of digital data stored as an individual entity. Non-limiting, illustrative examples of a resource include a document, an image, a folder, a file, and a link.

Having described an illustrative system 100 according to an embodiment, a description of several exemplary links that may be used by embodiments of the invention shall be described below.

Hard, Weak, and Symbolic Links

Information about a link that exists between two or more resources 170 is recorded in link records 160 that are stored in database 140. A particular link record may identify a type of link between the two or more resources 170. Several examples of the types of links that may be identified by link records 160 include a hard link, a weak link, and a symbolic link. The description of hard links, weak links, and symbolic links which follows is not meant to fully enumerate the type of links which may be identified by link records 160, as link records 160 may be used to identify any type of link between a source resource and a target resource.

When a source resource has a hard link to a target resource, the target resource is uniquely identified, to repository 150, by the hard link. For example, the particular link record establishing the hard link may include a target resource identifier assigned to the target resource by the repository 150. Thus, if the target resource were to move to another location within the repository 150, the hard link between the source resource and the target resource would be preserved because the target resource is uniquely identified, within repository 150, by the target resource identifier. In an embodiment where repository 150 is implemented in database 140, database 140 may assign the target resource identifier. For example, if database 140 is a database, then the database may assign an object identifier to. uniquely identify the target resource. In this way, regardless of where the target resource is moved to within repository 150, the database may identity the target resource using the object identifier.

In addition, a hard link guarantees the integrity of the link. In other words, a target resource cannot be deleted from repository 150 if any other resource, within repository 150, has a hard link to the target resource. In this way, a hard link may be used to prevent the accidental deletion of a target resource that has a hard link to the target resource.

Similar to a hard link, when a source resource has a weak link to a target resource, the target resource is uniquely identified by the weak link. For example, the particular link record establishing a particular weak link may also include a target resource identifier assigned to the target resource by repository 150. However, unlike a hard link, a weak link does not guarantee the integrity of the link. Thus, a weak link does not prevent a target resource from being deleted from repository 150 if another resource, stored within repository 150, has a weak link to the target resource.

Because a target resource that has a hard link to it cannot be deleted from the repository 150, system 100 may be configured to require a certain permission level to add a hard link to a target resource. However, even if a user does not have a sufficient permission level to add a hard link to a target resource, the user may still wish to uniquely identify the target resource with repository 150 so that the link is preserved if the target resource is moved to a different location within repository 150. In such a case, using a weak link may be advantageous.

When a source resource has a symbolic link to a target resource, the symbolic link does not uniquely identify the target resource within repository 150, but rather, the symbolic link identifies a location, within repository 150, at which the target resource resides. Thus, if the target resource is moved to a different location within repository 150, the symbolic link will no longer point to the target resource. However, if a new target resource is moved to the location identified by the symbolic link, then the symbolic link will point to the new target resource. Symbolic links may identify a location within repository 150 by identifying a particular path, within repository 150, to the location at which the target resource resides.

The paths to target resources, identified by symbolic links, are resolved when the symbolic link is accessed. Thus, a symbolic link may be useful when a resource wishes to maintain a link to a specific location within repository 150, rather than linking to a specific resource within the repository. For example, there may exist seven folders in repository 150 which correspond to the seven days of the week. Six of the seven folders are stored at a first location, and the folder that corresponds to the current day is stored at a second location. At the end of each day, the folder corresponding to the current day may be moved back to the first location, and the folder corresponding to the new day may be moved from the first location to the second location. Updates are made to the folder corresponding to the current day. In this way, a rolling archive of the week's activity may be performed. If a resource wishes to link to the folder corresponding to the current day, the intent is to link the resource to whichever folder happens to correspond to the current day, rather than linking to a specific folder. Thus, a symbolic link may be used in this situation to link a resource to the folder occupying the second location (the location where the folder for the current day is stored).

Additionally, symbolic links may be employed when it is desirable to link a resource to another resource that is stored outside of repository 150. Since a target resource identifier cannot be assigned by repository 150 to a resource that is not maintained by the repository 150, a symbolic link may be used to describe this relationship. For example, the repository 150 may register a callback function to access a resource stored outside of repository 150. In this way, the symbolic link may reference and make use of the callback function to identify a location, where the target resource may be stored, outside of repository 150. Symbolic links also do not guarantee the integrity of the link. Thus, a symbolic link does not prevent a target resource from being deleted from repository 150 if other resources stored within repository 150 have a symbolic link to the target resource.

While embodiments of the invention shall chiefly be described with reference to a single source resource that has a relationship to a single target resource, a single resource may have a relationship with two or more resources. Accordingly, relationship data stored within a source resource or a relationship-identifying resource may identify that a source resource has a relationship with two or more target resources.

Having described several examples of the different types of relationships that may be identified by relationship data within a source resource or relationship-identifying resource, an approach for processing file system operations within system 100, according to embodiments of the invention, shall now be described.

Processing File System Operations

In file system protocols, such as NFS, file system operations are performed on resources using a filehandle, which is an identifier that uniquely identifies a particular resource. Thus, when client 110 transmits a request for the performance of a file operation on a particular resource to database server 130, the request will contain a filehandle that uniquely identifies that resource.

Filehandles are opaque to client 110. In other words, client 110 does not need to be able to parse or process any information contained in the filehandle. Instead, when client 110 wishes to receive a particular file, client 110 sends a request to receive the particular file, along with the filehandle associated with the file, to database server 130. In return, client 110 will receive the requested file from database server 130.

While filehandles are opaque to client 110, database server 130, and the components thereof, may read information that was incorporated into the filehandle at the time the filehandle is generated. This information is used by database server 130, and the components thereof, in performing the requested file system operations on the resources identified by the filehandle.

Anytime that database server 130 sends a resource, such as a file, to client 110, the database server 130 sends a filehandle, identifying the resource, to client 110. In an embodiment, the file system operation module 334 processes file system operations, received at database server 130, to be performed on resources stored in repository 150. As a result of processing such a file system operation, anytime that the file system operation module 134 sends a resource back to client 110, the file system operation module 134 generates a filehandle for the resource previously stored in the repository 150, if the filehandle is not otherwise already available, to allow the file system operation module 134 to send the filehandle back to the client 110 along with the requested resource.

In an embodiment, to generate a filehandle for a resource physically stored in the repository 150, file system operation module 134 generates the filehandle based, at least in part, on an object identifier (OID) that uniquely identifies the resource to that database 340. The object identifier for a particular resource may be determined by consulting the data dictionary 162. Thus, each filehandle generated in this fashion uniquely identifies a particular resource stored in repository 150. By generating filehandles in such a manner, the file system operation module 134 may inspect a filehandle to determine the object identifier, and thereafter locate the particular resource in the file system repository 142 based on the object identifier.

Further description of how filehandles are generated, and the information that may be incorporated into the filehandle when it is generated, is provided in the file system operations patent and the virtual folder patent. Having described how file system operations are generally processed by file system operation module 134, an illustrative example of processing a file system operation involving a link shall be presented.

Creating a Link Within the Repository

Figure 2:
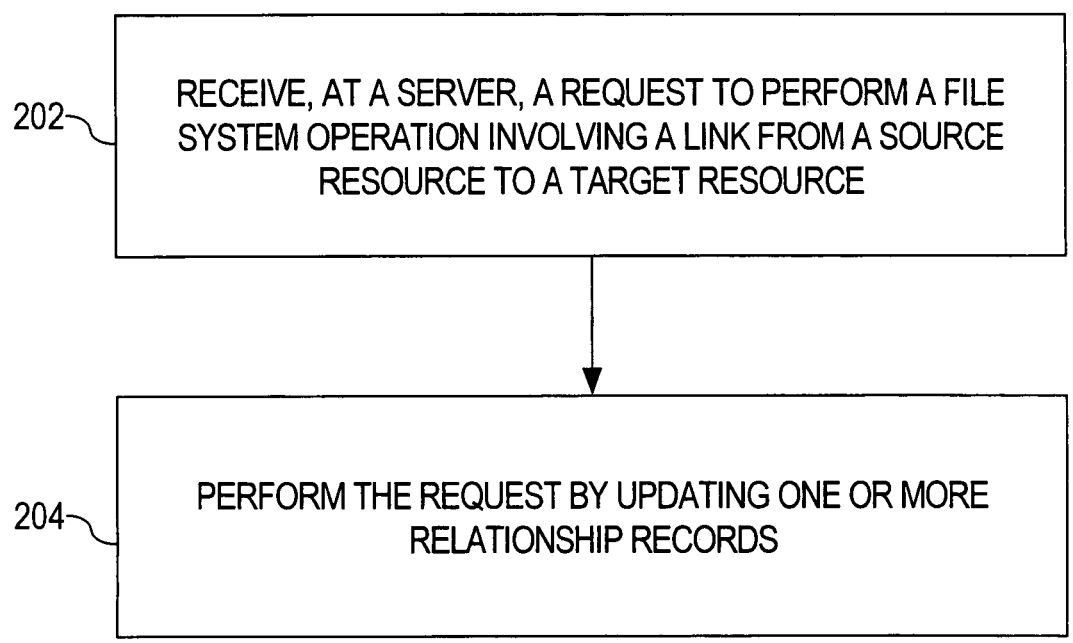
FIG. 2 is a flowchart illustrating the functional steps of performing a file system operation according to an embodiment of the invention.

FIG. 2 is a flowchart illustrating the functional steps of performing a file system operation according to an embodiment of the invention. The functional steps of FIG. 2 shall be described below with reference to processing a request to perform a file system operation to create a link within repository 150.

Initially, in step 202, a request to perform a file system operation involving a link is received at database server 130 from client 110. The request may be received at database server 130 by protocol interpreter 132. Since the request involves a file system operation, protocol interpreter 132, upon receiving the request in step 202, will forward to the request to file system operation module 134 for processing.

If the file system operation of step 202 involves creating a link within repository 150, then the file system operation may be embodied by either the CREATE NFS command or the LINK NFS command. Each of these commands shall be explained below.

The NFS command CREATE may be used to create a symbolic link within repository 150. To create a symbolic link using the CREATE command, a user specifies a name of the symbolic link, and a path to a target resource.

As another example of creating a symbolic link, the UNIX command ln may be used to create a symbolic link. For example, the command:

-s /usr/local/apache/logs ./logs creates a symbolic link entitled "./logs" to the location identified by the path "/usr/local/apache/logs."

The NFS command LINK may be used to create a hard link within repository 150. To create a hard link using the LINK command, a user specifies a name of the hard link, and a unique identifier (such as a filehandle) that identifies a target resource.

While the NFS protocol does not natively support weak links, as explained in further detail below, system 100 may be used to create a weak link in repository 150 using the NFS protocol. After the file system operation involving a link is received in step 202, processing proceeds to step 204.

In step 204, the file system operation involving the link is performed by file system operation module 134. When file system operation module 134 processes the file system operation to create a new link, file system operation module 134 stores a link record for the newly created link within link records 160. The link record contains information describing the new link. For example, file system operation module 134 may create a symbolic link by storing the name of the new symbolic link, a unique identifier for a source resource associated with the new symbolic link, and a path to the target resource in a link record in link records 160. The source resource associated with the symbolic link may be the directory in which the symbolic link resides. The path to the target resource may or may not be within repository 150.

File system operation module 134 may create a hard link by storing the name of the new hard link, a unique identifier for the source resource associated with the hard link, and a unique identifier for the target resource associated with the hard link in a link record. The source resource associated with the hard link may be the directory in which the hard link resides. The path identified by a symbolic link may or may not be within the repository 150.

Additionally, since a hard link guarantees the integrity of the link, whenever a new hard link is created within repository 150, a hard link counter value, associated with the target resource, is incremented by file system operation module 134. Similarly, whenever a resource that has a hard link to a target resource is removed, then the hard link counter value associated with the target resource is decremented by file system operation module 134. In this way, file system operation module 134 may monitor, for each resource in repository 150, how many other resources within repository 150, have a hard link to a particular resource. File system operation module 134 may prevent a particular resource, stored in repository 150, from being deleted if the hard link counter value, associated with that particular resource, has a value greater than zero.

In an embodiment, link records 160 are stored in database 140 in a structure separate from the source resource and/or the target resource associated with the link. For example, link records 160 may be stored in one or more link tables that store link records 160, but do not store any source or target resources within repository 150.

In another embodiment, a link record may be stored in database 140 in a structure also storing either a source resource or a target resource for the link associated with the link record. For example, a row of a table storing, at least a portion of either the source resource or the target resource may also store at least a portion of the link records corresponding to the link between the source resource and the target resource.

Once link records are stored within database 140, a user may issue requests, to database server 130, to view certain link records 160 that satisfy specified search criteria. A user may issue requests for information about the source resource, the target resource, link type, or any other property of a link that is stored in link records 160. In this way, the user may view any information about the links between resources 170.

Having described the process of performing a file system operation to create a link, the performance of a file system operation to read a target resource identified by a link will now be explained.

Reading a Target Resource Identified by a Link

File system operation module 134 may process a file system operation to read a particular resource identified by a link. In processing the file system operation, file system operation module 134 will access the particular link record, within link records 160, associated with the link identified by the file system operation. The particular link record will contain information identified the target resource requested by the file system operation. Thereafter, file system operation module 134 will return the requested resource, along with a filehandle identifying the requested resource, to client 110.

For example, in version 4 of the NFS protocol, the READLINK command may be used to read a target resource identified by a symbolic link. When file system operation module 134 processes a READLINK command, file system operation module 134 returns the target resource, as well as a filehandle identifying the target resource, to client 110.

As another example, in version 4 of the NFS protocol, the LOOKUP command may be used to read a target resource identified by a hard link. When file system operation module 134 processes a LOOKUP command, file system operation module 134 returns the target resource, as well as a filehandle identifying the target resource, to client 110.

The discussion of the READLINK command and the LOOKUP command are merely exemplary, as client 110 may issue other file system operation commands for reading resources to file system operation module 134. Having described the process of performing a file system operation to read a target resource identified by a link, the performance of a file system operation to (a) delete a link or (b) delete a target resource identified by a link will now be explained.

Removing a Link or a Target Resource Identified by a Link

File system operation module 134 may also process file system operations to remove a link between two or more resources 170. In processing such a file system operation, file system operation module 134 may remove the particular link record, within the link records 160, associated with the link specified by the file system operation.

Similarly, file system operation module 134 may also process file system operations to remove a particular resource in resources 170. In processing such a file system operation, file system operation module 134 may cause the particular resource to be deleted from repository 150.

In embodiments of the invention, a hard link may be removed without affecting the target resource associated with the hard link as long as there is at least one remaining hard link to the target resource. However, when the last hard link to the target resource is removed, file system operation module 134 automatically causes the target resource to be removed from repository 150.

In embodiments of the invention, a symbolic link may be removed without affecting the target resource associated with the symbolic link.

In embodiments of the invention, a resource may be deleted even if there are symbolic links referring to it. As explained above, a resource cannot be removed if it has one or more hard links to the resource.

While several examples of processing file system operations have been described above, embodiments of the invention may be used to process any type of file system operation involving a link. Thus, the types of file system operations which file system operation module 134 may process are not limited to creating a link, reading a resource identified by a link, or removing a resource or a link.

Having described the process of performing a file system operation to (a) delete a link or (b) delete a target resource identified by a link, additional description regarding how to support weak links in system 100 using the NFS protocol will now be provided.

Supporting Weak Links Using the NFS Protocol

While system 100 may be used to identify a variety of different types of links between resources, version 4 of the NFS protocol only supports hard links and symbolic links. Thus, version 4 of the NFS protocol does not support weak links. However, embodiments of the invention may be used to create a weak link using the NFS protocol. Specifically, system 100 may be configured to process certain requests for the performance of a file system operation involving a certain type of link other than a weak link (such as a symbolic link) as if the request involved a weak link.

The manner in which system 100 may be configured to process certain requests for the performance of a file system operation involving a certain type of link other than a weak link (such as a symbolic link) as if the request involved a weak link may vary from implementation to implementation. For example, in one embodiment, system 100 may be configured in this manner using an attribute of the source resource or the target resource associated with the link. Alternatively or additionally, system 100 may be configured in this manner using a session-based attribute. Alternatively or additionally, system 100 may be configured in this manner using a resource configuration, as explained in further detail below.

The framework patent application discloses techniques for integrating logic through the use of "resource configurations." A resource configuration is a unit of logic that is associated with one or more resources within repository 150. Each resource configuration contains one or more configuration items that each defines and/or expresses one or more rules for managing a resource associated with a resource configuration.

Repository 150 interprets, evaluates, and/or analyzes a resource configuration to carry out the rules expressed therein. A resource configuration can be associated with one or more resources in various ways. For example, a resource configuration may be associated with resources that reside within a particular directory or that belong to a particular resource type. A resource that has been associated with a resource configuration is referred to herein as an associated resource.

Each time repository 150 performs an operation upon an associated resource, repository 150 carries out a rule specified in a resource configuration associated with the resource. A resource configuration may specify that all associated resources exhibit a certain characteristic, e.g., all associated resources shall be processed as a certain type of link (such as a weak link) regardless of the type of link identified in the relationship data. In this way, client 110 may issue a file system operation request involving a certain type of link (such as a symbolic link) to database server 130, and sever 130 may process the file system operation as if it involved a weak link.

Having discussed how to support weak links in system 100 using the NFS protocol, illustrative implementing mechanisms for client 110, database server 130, and database 140 shall now be discussed.

Implementing Mechanisms

Figure 3:
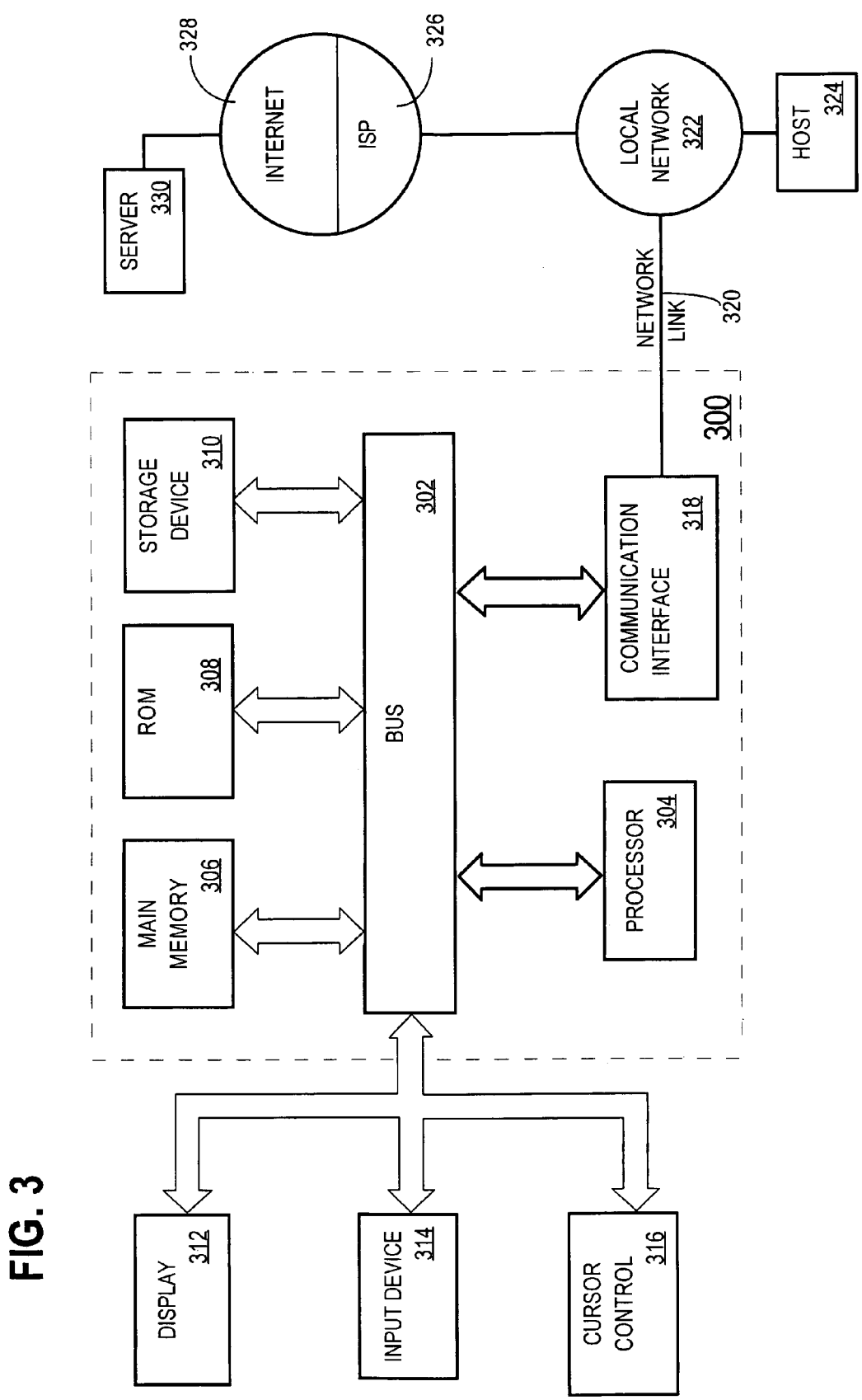
FIG. 3 is a block diagram that illustrates a computer system upon which an embodiment of the invention may be implemented.

In an embodiment, client 110, database server 130, and database 140 may each be implemented using a computer system. FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any Medium that participates in providing data that causes a machine to operation in a specific fashion. In an embodiment implemented using computer system 300, various machine-readable media are involved, for example, in providing instructions to processor 304 for execution. Such a media may take many forms, including but not limited to, non-volatile storage media, volatile storage media, and transmission media. Non-volatile media includes, for example, optical or magnetic disks, such as storage device 310. Volatile storage media includes dynamic memory, such as main memory 306. Transmission media includes coaxial cables, copper wire and fiber optics, including the wires that comprise bus 302. Transmission media can also take the form of acoustic or light waves, such as those generated during radiowave and infra-red data communications. All such media must be tangible to enable the instructions carried by the media to be detected by a physical mechanism that reads the instructions into a machine.

Common forms of machine-readable storage media include, for example, a floppy disk, a flexible disk, hard disk, magnetic tape, or any other magnetic storage medium, a CD-ROM, any other optical storage medium, any other physical storage medium, a RAM, a PROM, and EPROM, a FLASH-EPROM, any other memory chip or any other storage medium from which a computer can store and read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:

receiving, at a database server that processes Structured Query Language (SQL) queries, a request to perform a file system operation involving a link from a source resource to a target resource, wherein the source resource is stored within a repository implemented by a SQL-queriable relational database;

wherein the file system operation is a file system operation that requests creation, in a file system, of a link that is of a first link type;

in response to the request of the file system operation, and based on configuration information, creating a particular link that is of a second link type instead of the link that is of the first link type, wherein the configuration information includes one or more rules associated with the source resource;

wherein the first link type differs from the second link type, wherein the database server performs the file system operation by accessing, in the SQL-queriable relational database, one or more link records to carry out the requested file system operation, and wherein the file system operation specifies the creation of the particular link, wherein the accessing the one or more link records includes adding a new link record to the one or more link records, and wherein the new link record identifies characteristics about the particular link.

2. The method of claim 1, wherein the database server performs the file system operation by accessing, in the database, one or more link records to carry out the requested file system operation, and wherein said link records are stored in the database in a relational database table that also stores either said source resource or said target resource.

3. The method of claim 1, wherein the file system operation is a Network File System (NFS) file system operation to create a symbolic link, and further comprising:
accessing the configuration information to determine that the NFS file system should be processed to create a weak link and not a symbolic link.

4. The method of claim 3, wherein the configuration information is an attribute of the source resource or the target resource.

5. The method of claim 3, wherein the configuration information describes how to interpret any requests, received by the database server, for the creation of a symbolic link.

6. The method of claim 1, further comprising:
in response to receiving a second request, from a client, to read the target resource associated with the particular link, retrieving the target resource and a filehandle for the target resource from the repository; and
the database server transmitting the target resource and the filehandle to the client.

7. The method of claim 1, wherein the database server performs the file system operation by accessing, in the database, one or more link records to carry out the requested file system operation, and wherein the source resource is a particular file directory in the file system, wherein the target resource is a particular file in the file system, wherein the particular file is not located in the particular file directory in the file system, and wherein the database server performs the file system operation at least in part by adding, to the one or more link records that are stored in the database, a new link record that specifies a link from the particular file directory to the particular file.

8. The method of claim 1, wherein the file system is Network File System (NFS).

9. The method of claim 1, wherein the file system is UNIX.

10. The method of claim 1, wherein the file system lacks a command to create a weak link, and wherein the second link type is a weak link type rather than a hard link type or a symbolic link type.

11. The method of claim 1, wherein creating the particular link comprises creating the particular link from the source resource to the target resource.

12. The method of claim 1, wherein the configuration information indicates that a link of the second link type should be created in response to a request to create a link of the first link type.

13. A volatile or non-volatile computer-readable storage media storing instructions which executed by one or more processors, cause the one or more processors to perform steps comprising:
receiving, at a database server that processes Structured Query Language (SQL) queries, a request to perform a file system operation involving a link from a source resource to a target resource, wherein the source resource is stored within a repository implemented by a SQL-queriable relational database;
wherein the file system operation is a file system operation that requests creation, in a file system, of a link that is of a first link type,
in response to the request of the file system operation, and based on configuration information, creating a particular link that is of a second link type instead of the link that is of the first link type;
wherein the first link type differs from the second link type, wherein the configuration information includes one or more rules associated with the source resource;
wherein the database server performs the file system operation by accessing, in the SQL-queriable relational database, one or more link records to carry out the requested file system operation, and wherein the file system operation specifies the creation of the particular link, wherein the accessing the one or more link records includes adding a new link record to the one or more link records, and wherein the new link record identifies characteristics about the particular link.

14. The volatile or non-volatile computer-readable storage media of claim 13, wherein the database server performs the file system operation by accessing, in the database, one or more link records to carry out the requested file system operation, and wherein said link records are stored in the database in a relational database table that also stores either said source resource or said target resource.

15. The volatile or non-volatile computer-readable storage media of claim 13, wherein the file system operation is a Network File System (NFS) file system operation to create a symbolic link, and further comprising: accessing the configuration information to determine that a NFS file system should be processed to create a weak link and not a symbolic link.

16. The volatile or non-volatile computer-readable storage media of claim 13, wherein the configuration information is an attribute of the source resource or the target resource.

17. The volatile or non-volatile computer-readable storage media of claim 13, wherein the configuration information describes how to interpret any requests, received by the database server, for the creation of a symbolic link.

18. The volatile or non-volatile computer-readable storage media of claim 13, wherein the steps further comprise: in response to receiving a second request, from a client, to read the target resource associated with the particular link, retrieving the target resource and a filehandle for the target resource from the repository; and the database server transmitting the target resource and the filehandle to the client.

19. The volatile or non-volatile computer-readable storage media of claim 13, wherein the database server performs the file system operation by accessing, in the database, one or more link records to carry out the requested file system operation, and wherein the source resource is a particular file directory in the file system, wherein the target resource is a particular file in the file system, wherein the particular file is not located in the particular file directory in the file system, and wherein the database server performs the file system operation at least in part by adding, to the one or more link records that are stored in the database, a new link record that specifies a link from the particular file directory to the particular file.

20. The volatile or non-volatile computer-readable storage media of claim 13, wherein the file system is Network File System (NFS).

21. The volatile or non-volatile computer-readable storage media of claim 13, wherein the file system is UNIX.

22. The volatile or non-volatile computer-readable storage media of claim 13, wherein the file system lacks a command to create a weak link, and wherein the second link type is a weak link type rather than a hard link type or a symbolic link type.

23. The volatile or non-volatile computer-readable storage media of claim 13, wherein creating the particular link comprises creating the particular link from the source resource to the target resource.

24. The volatile or non-volatile computer-readable storage media of claim 13, wherein the configuration information indicates that a link of the second link type should be created in response to a request to create a link of the first link type.

* * * * *

UNITED STATES PATENT AND TRADEMARK OFFICE
CERTIFICATE OF CORRECTION

PATENT NO. : 7,610,304 B2 Page 1 of 1
APPLICATION NO. : 11/294894
DATED : October 27, 2009
INVENTOR(S) : Namit Jain et al.

It is certified that error appears in the above-identified patent and that said Letters Patent is hereby corrected as shown below:

In column 6, line 41, delete "to." and insert -- to --, therefor.

In column 9, line 21, delete "-s" and insert -- In-s --, therefor.

In column 13, line 20, delete "media" and insert -- storage media --, therefor.

In column 14, line 54, in claim 1, delete "the link" and insert -- a link --, therefor.

In column 15, line 56, in claim 13, delete "which" and insert -- which, when --, therefor.

In column 15, line 67, in claim 13, delete "type," and insert -- type; --, therefor.

In column 16, line 3, in claim 13, delete "the link" and insert -- a link --, therefor.

Signed and Sealed this

Twenty-first Day of September, 2010

David J. Kappos
*Director of the United States Patent and Trademark Office*